United States Patent [19]

Adams

[11] 4,009,651
[45] Mar. 1, 1977

[54] NUTCRACKER

[76] Inventor: Fred M. Adams, 143 Carroll St., Shreveport, La. 71105

[22] Filed: Nov. 3, 1975

[21] Appl. No.: 628,426

[52] U.S. Cl. .................................. 99/579; 99/571; 99/582; 30/120.3

[51] Int. Cl.² ........................................ A23N 5/00

[58] Field of Search ............ 99/581, 582, 571, 579, 99/572; 30/120.1, 120.2, 120.3, 120.4, 120.5; D7/98; 100/233

[56] References Cited

UNITED STATES PATENTS

| | | | |
|---|---|---|---|
| 1,134,265 | 4/1915 | Harper | 99/582 X |
| 1,400,099 | 12/1921 | Pueppke | 99/581 |
| 2,799,310 | 7/1957 | Jacobs | 99/579 X |
| 2,804,111 | 8/1957 | Burchett | 99/577 X |
| D158,932 | 6/1950 | Carlson | D7/98 |

Primary Examiner—Richard E. Aegerter
Assistant Examiner—Richard R. Stearns

[57] ABSTRACT

A nutcracker designed to eliminate the scattering of shells and hulls in the cracking operation which includes a carrying tray with a hinged base mounted therein and having a cooperating hinged cracking lever with cracking lever flanges to permit cracking nuts by operation of the lever and simultaneously preventing the hulls or shells from scattering. The nut is confined in a cracking chamber defined by the cracking lever, the cracking lever flanges and the hinged base.

10 Claims, 7 Drawing Figures

U.S. Patent    Mar. 1, 1977    4,009,651
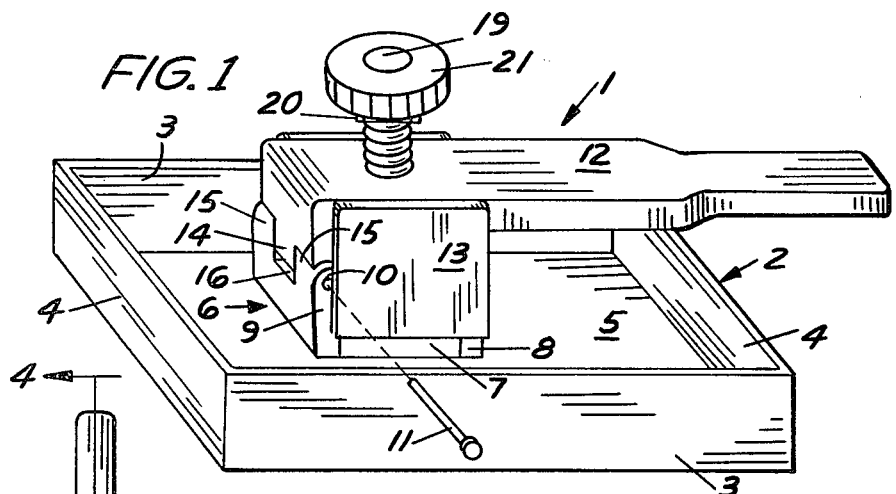
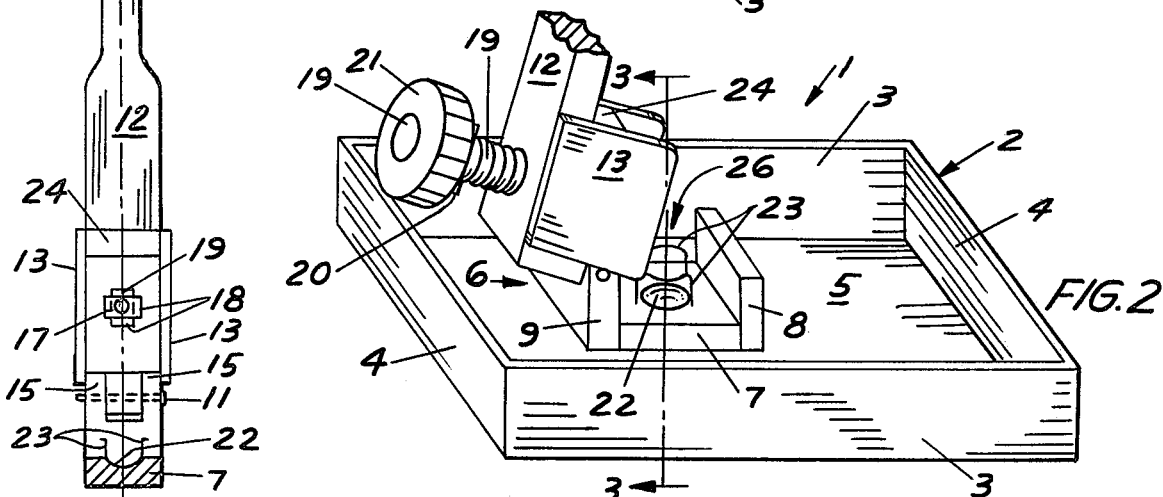
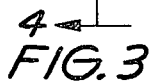
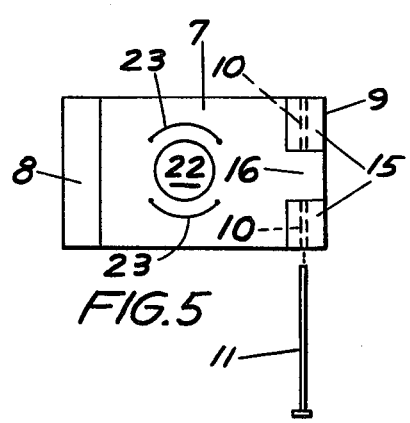
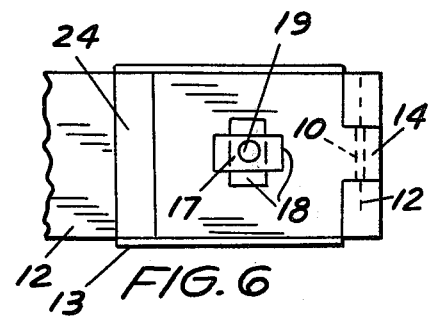
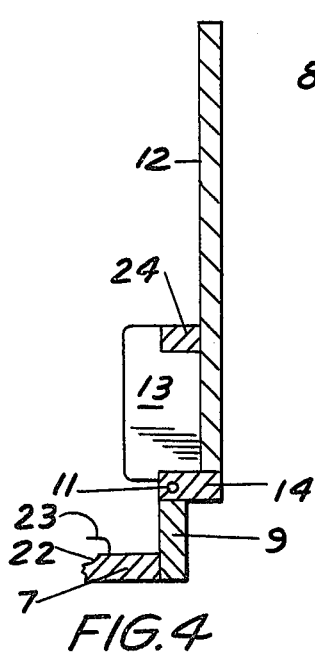
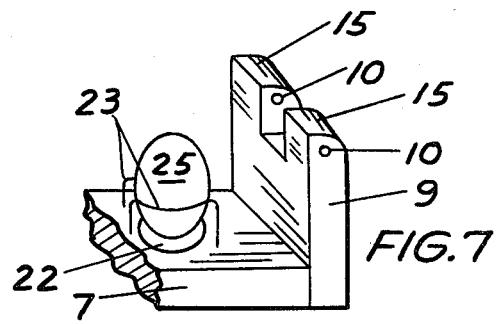

NUTCRACKER

BACKGROUND OF THE INVENTION

1. Field of the Invention

This invention relates to a new and improved device for cracking nuts and more particularly, to a nutcracker which operates to crack nuts without scattering hulls or shells. The nutcracker of this invention may be operated without the necessity of being clamped or otherwise secured to a bench or tablet and, it is portable, light in weight, and is capable of simultaneously carrying both a supply of nuts to be cracked and a quantity of cracked nuts. The nutcracker is simple and easy to operate and prevents the scattering of hulls and shells during the cracking operation by containing the nuts in an enclosed cracking chamber, which enhances the utility of the device indoors. The nutcracker can be used to crack substantially any nut which will fit inside the cracking chamber, and may be designed and adjusted to accommodate the cracking of nuts of varying size and description.

2. Description of the Prior Art

Heretofore, various devices have been developed to crack nuts, most of which are equipped with a cracking mechanism consisting of cracking jaws and at least one cracking lever. For example, U.S. Pat. No. 3,713,468 to Carol H. Walsh discloses a nutcracker having a hollow guide cylinder containing a piston which reciprocates inside the cylinder with respect to an adjustable jaw to facilitate cracking of a nut placed between the piston and the jaw. The nutcracker is lever-operated, the lever being attached to the piston in order to apply pressure on the nut to be cracked. Furthermore, in U.S. Pat. No. 2,804,111 to P. C. Burchett, a manually operated nutcracker designed essentially in the shape of a pair of pliers is disclosed, with a nutcracking chamber and a pair of jaws cooperating with a pair of levers to facilitate the necessary cracking pressure.

Conventional nutcracking devices are characterized by many undesirable features. For example, nutcrackers of the piston design generally require some external stabilizing means since operation of the lever with sufficient power to crack nuts requires that the frame be clamped or otherwise firmly mounted to a strong support. Another disadvantage inherent in nutcrackers of this design is the problem of excessively cracking the nut since no means is provided for preventing the travel of the piston toward the jaw even after the nut is sufficiently cracked. Accordingly, if the shell happens to be quite hard and sufficient force is applied to crack it, this force frequently results in excessively crushing the meat in the nut.

Hand nutcrackers are frequently subject to the limitation of requiring considerable pressure on the handgrip members to achieve sufficient power to crack the nut. Accordingly, nuts having thick shells such as walnuts and hickory nuts would be very difficult if not impossible to crack utilizing such devices because of the limited amount of leverage which can be realized by squeezing the handgrips together to achieve cracking. Furthermore, removal of nuts from the cracking chamber would appear to be somewhat cumbersome where positioning springs located inside the cracking chamber are used, since the springs tend to force the nut in an upward position against the upper cracking member, thereby making removal of the cracked nut difficult.

Accordingly, it is an object of this invention to provide an improved nutcracker which is portable, does not require mounting or clamping to be used, and is equipped with a built-in tray to store both uncracked and cracked nuts both during the cracking operation and when the nutcracker is not in use.

Another object of the invention is to provide a new and improved nutcracker having an enclosed cracking chamber which operates to prevent the scattering of hulls and shells during the cracking operation, thus enabling the nutcracker to be used inside the home, in an automobile or elsewhere under circumstances where the scattering of shells would be undesirable.

A still further object of the invention is to provide a new and improved nutcracker which is equipped with an adjustable cracking lever and a rear base member which permits the cracking operation to be achieved by a sharp blow to the cracking lever rather than by an unregulated pull or jerk as in many conventional nutcracking devices.

Yet another object of the invention is to provide a new and improved device for cracking substantially any nut, which is adjustable to accommodate nuts of varying sizes and shapes and to achieve a clean cracking of the nut shell or hull to enable the meat to be removed in large pieces with a minimum of crushing.

Another object of the invention is to provide a new and improved nutcracker which is functional and yet pleasing in appearance, and which therefore functions as a decorative item either alone or with a supply of nuts, as well as operating efficiently to crack nuts.

SUMMARY OF THE INVENTION

These and other objects of the invention are provided in a nutcracker for cracking nuts without scattering hulls or shells which includes the following elements.

1. A tray for storing both cracked and uncracked nuts;

2. A base member, including a cracking block, adapted to seat a nut to be cracked and hold it firmly in place during the cracking operation; and 3. A cracking lever and flange combination in hinged cooperation with the base member to form a cracking chamber within which nuts may be cracked by operation of the lever without the scattering of hulls or shells.

BRIEF DESCRIPTION OF THE DRAWINGS

The invention will be better understood in view of the following description presented with reference to the accompanying drawings.

FIG. 1 of the drawing is a perspective view of the nutcracker of this invention with the cracking lever in closed position;

FIG. 2 is a perspective view of the nutcracker illustrated in FIG. 1 with the cracking lever in the open position ready to receive a nut for cracking;

FIG. 3 is a bottom view, partially in section, of the cracking lever and base of the nutcracker illustrated in FIGS. 1 and 2, taken along lines 3—3 in FIG. 2, and more particularly illustrating the interior of the cracking lever and flange assembly and the cracking head and cracking block of the base;

FIG. 4 is a sectional view of the cracking lever and base illustrated in FIG. 3 of the drawing and taken along lines 4—4 in FIG. 3, more particularly illustrating the relationship of one of the cracking lever flanges to the cracking lever and cracking block of the base;

FIG. 5 is a top elevation of the base illustrated in FIGS. 1–4 of the drawing, more particularly showing the relationship between the cracking block nut supports, nut depression and base hinges for cooperating with the cracking lever;

FIG. 6 is an elevational view, partially in section, of the interior of the cracking lever, more particularly illustrating the cracking head and the hinging relationship between the cracking lever and the forward base member which cooperates with the cracking block; and FIG. 7 is a perspective view, partially in section, further illustrating the positioning of a nut on the cracking block prior to the cracking operation.

DESCRIPTION OF THE PREFERRED EMBODIMENTS

Referring now to FIG. 1 of the drawing, the nutcracker of this invention, generally illustrated by reference numeral 1, is shown with tray 2 formed by sides 3, ends 4 and bottom 5. Base 6 is securely mounted to bottom 5 of tray 2, and is defined by cracking block 7, which is adjacent and secured to bottom 5, rear base member 8 and forward base member 9, both of which are vertically oriented and securely attached to cracking block 7. Forward base member 9 is fitted with forward base member hinges 15, and forward base member slot 16 located between forward base member hinges 15 to accommodate cracking lever hinge 14 of cracking lever 12. Forward base member aperture 10 is drilled through forward base member hinges 15 and through cracking lever hinge 14, to accommodate hinge pin 11 which hingedly joins cracking lever 12 and forward base member 9 of base 6. Cracking lever flanges 13 are secured to each side of cracking lever 12 and are downwardly extending to overlap cracking block 7, rear base member 8, and forward base member 9 to define a cracking chamber 26 (illustrated in FIG. 2).

As illustrated in FIGS. 2 and 4 of the drawing, cracking lever 12 is permitted to pivot on forward base member 9 of base 6 by cooperation between forward base member hinges 15, cracking lever hinge 14 and hinge pin 11, to allow the placing of a nut 25 (illustrated in FIG. 7 of the drawing) in position for cracking on nut depression 22 and in cooperation with nut supports 23.

Referring now to FIGS. 3 and 6 of the drawing, cracking head 17 is threadably positioned on cracking head bolt 19 and is equipped with cracking head flanges 18 to securely grip the top portion of nut 25 in the cracking operation. Cracking head bolt 19 cooperates in threadable relationship with cracking lever 12 to permit adjustment of cracking head 17 in order to accommodate nuts of varying sizes prior to cracking. This adjustment is accomplished by manipulating cracking head adjusting wheel 21, which is mounted on cracking head bolt support 20 in cooperation with cracking head bolt 19, and selectively raises and lowers cracking head 17 with respect to a nut 25 positioned on cracking block 7, as illustrated in FIG. 7. Cracking lever 12 is fitted with cracking lever stop 24, which mates with rear base member 8 when cracking lever 12 is in the closed position, as illustrated in FIG. 1 of the drawing. Furthermore, as heretofore noted, cracking lever flanges 13 serve to help define cracking chamber 26, formed by cooperation between cracking lever flanges 13, cracking lever 12, and base 6 to prevent shattered hulls or shells from being scattered during the cracking operation, as illustrated in FIGS. 1–4 of the drawing.

FIG. 5 of the drawing particularly illustrates nut depression 22 and nut supports 23 on cracking block 7 for positioning a nut directly beneath cracking head 17. Nut supports 23 are designed to stabilize the nut and prevent it from slipping out of alignment with cracking head 17 prior to the cracking operation.

In operation, a nut 25 is first placed in position in nut depression 22 of cracking block 7, in the secure grip of nut supports 23, as illustrated in FIG. 7 of the drawing. Lever 12 is then closed until contact is made between cracking head 17 and the top portion of nut 25. Cracking head adjusting wheel 21 is then manipulated to provide an opening of from about ½ to about ¾ of an inch between rear base member 8 and cracking lever stop 24. When this adjustment is completed, the nut is cracked by striking cracking lever 12 sharply with the hand to cause cracking lever stop 24 to meet rear base member 8. Cracking lever 12 is then opened as illustrated in FIG. 2 of the drawing, the shattered nut removed, and another nut placed into position as noted above. Cracking head adjusting wheel 21 can be manipulated as desired to closely control the degree of cracking in order to prevent excessive crushing of the meat in the nut.

It will be appreciated as heretofore noted, that cracking chamber 26 is defined by cooperation between cracking lever 12, base 6, cracking lever flanges 13 and cracking lever stop 24 to form a sealed chamber which prevents hulls and shells from scattering as pressure is brought to bear on the enclosed nut which cracks due to the force applied. It will be further appreciated that the nut is more cleanly and uniformly cracked by application of a sharp blow by the hand which is controlled as to degree of cracking, than by uncontrolled pressure, as in most conventional nutcrackers and particularly those of the piston design. This is made possible by the adjustable relationship between cracking lever stop 24 and rear base member 8 which controls the length of travel of cracking head 17, and therefore, the degree of cracking of nut 25. Accordingly, the extent of cracking of nut 25 can be quite easily controlled by simply manipulating cracking head adjusting wheel 21, which in turn determines the degree of movement or travel of cracking head 17 with respect to cracking block 7, in breaking the nut.

While the nutcracker of this invention was developed primarily for cracking pecans, it is understood that substantially any nut can be cracked in the device. It is also preferred to utilize wood, and maple wood in particular, as the material of construction when cracking pecans, since it has been found that wood not only enhances the appearance of the nutcracker but is also sufficiently strong to accommodate the stress necessary to achieve cracking of the pecan. However, should it be desired to crack nuts having heavier shells than the pecan, such as walnut or hickory nuts, the nutcracker herein disclosed can be built of heavier wood, or in the alternative, metal framing, in order to accommodate sufficient cracking stress. Accordingly, substantially any nut known to those skilled in the art may be cracked by the nutcracker of this invention, depending upon the material of construction selected.

Referring again to FIGS. 1 and 2 of the drawing, it is apparent that the nutcracker of this invention can be easily cleaned by simply removing hinge pin 11 from registration with forward base member aperture 10 in forward base member hinges 15 and lifting cracking lever 12 away from base 6. Nut supports 23 are also removable to permit thorough cleaning of cracking block 7, and nut depression 22 in particular.

It will be appreciated that while cracking lever 12 may itself be threaded to receive cracking head bolt 19, it is preferred to use a nut embedded in cracking lever 12 and adapted to threadably receive cracking head bolt 19.

Have described my invention with the particularity set forth above, what is claimed is:

1. A nutcracker comprising:
    a. a tray having a pair of opposed upwardly extending sides and ends and an essentially flat bottom;
    b. a cracking block carried by said tray and having an upward standing generally flat forward base member and an upward standing generally flat rear base member adjacent said cracking block, said forward base member and said rear base member being in essentially parallel relationship to each other and separated by said cracking block; and
    c. a cracking lever hingedly mounted on said forward base member and having a pair of downwardly extending, spaced apart cracking lever flanges which are shaped and positioned to cooperate with said cracking block to define a closed nutcracking chamber when said cracking lever is closed over said cracking block.

2. The nutcracker of claim 1 further comprising a pair of wire retainer means carried by said cracking block to secure a nut in a position with one end of said nut to be cracked on said cracking block.

3. The nutcracker of claim 1 further comprising stop means on said cracking lever in cooperation with said rear base member to limit the travel of said cracking lever with respect to said cracking block.

4. The nutcracker of claim 1 further comprising:
    a. a pair of wire retainer means carried by said cracking block to secure a nut in position to be cracked; and
    b. stop means on said cracking lever in cooperation with said rear base member to limit the travel of said cracking lever with respect to said cracking block.

5. The nutcracker of claim 1 further comprising a cracking head carried by said cracking lever including adjusting means for adjusting the position of said cracking head with respect to said cracking lever.

6. The nutcracker of claim 1 comprising:
    a. a pair of upstanding wire retainer means carried by said base to secure a nut in a position with one end of said nut to be cracked on said cracking block;
    b. stop means on said cracking lever in cooperation with said rear base member to limit the travel of said cracking lever with respect to said cracking block; and
    c. a cracking head carried by said cracking lever including adjusting means for adjusting the position of said cracking head with respect to said cracking lever.

7. The nutcracker of claim 6 wherein said pair of upstanding wire retainer means carried by said base to secure a nut is a pair of wire supports removably mounted in said cracking block and further comprising a depression in said cracking block between said wire supports to receive said nut.

8. The nutcracker of claim 6 wherein said adjusting means is a bolt in threaded cooperation with said cracking lever.

9. The nutcracker of claim 1 further comprising a cracking head carried by said cracking lever and extending into said cracking chamber when said cracking lever is in position to crack a nut.

10. The nutcracker of claim 1 further comprising:
    a. a pair of upward standing wire supports mounted in said cracking block and a depression formed in said cracking block between said wire supports to secure said nut on one end of said nut in said depression;
    b. a cracking lever stop on said cracking lever in cooperation with said rear base member to limit the travel of said cracking lever with respect to said cracking block;
    c. a bolt in threaded cooperation with said cracking lever; and
    d. a cracking head mounted on one end of said bolt and extending into said cracking chamber when said cracking lever is in position to crack said nut.

* * * * *